United States Patent [19]

Allewitz

[11] 4,413,652

[45] Nov. 8, 1983

[54] GAS-LIQUID ACCUMULATOR

[75] Inventor: Murry Allewitz, Houston, Tex.

[73] Assignee: Oil Air Industries, Inc., Houston, Tex.

[21] Appl. No.: 248,143

[22] Filed: Mar. 30, 1981

[51] Int. Cl.³ .............................................. F16L 55/04

[52] U.S. Cl. ...................................... 138/31; 137/192; 137/207.5; 138/30; 220/316; 220/DIG. 17; 251/83

[58] Field of Search ...................... 138/30, 31; 239/89, 239/96; 220/DIG. 17, 319, 328, 316; 285/306; 251/82, 83; 137/375, 192, 207.5, 399, 410, 522

[56] References Cited

U.S. PATENT DOCUMENTS

| | | | |
|---|---|---|---|
| 1,947,257 | 2/1934 | Fritz et al. | 137/375 |
| 2,725,252 | 11/1955 | Greer | 220/319 |
| 3,316,939 | 5/1967 | Mercier | 138/30 |
| 3,319,658 | 5/1967 | Mercier | 138/30 |
| 3,613,734 | 10/1971 | Elmer | 138/31 |

FOREIGN PATENT DOCUMENTS

| | | | |
|---|---|---|---|
| 1183477 | 3/1970 | United Kingdom | 138/31 |

*Primary Examiner*—Stephen Marcus
*Assistant Examiner*—Mark J. Thronson
*Attorney, Agent, or Firm*—Fulbright & Jaworski

[57] ABSTRACT

An accumulator having a housing, a spring-loaded liquid inlet-outlet valve, a gas charging and release valve, and a gas-liquid separator in which a top is provided releasably connected to the housing for servicing the accumulator from the top. The top is slidably insertable into the top of the housing and a releasable lock is positioned externally of the top for locking the top in the housing. The lock is prevented from releasing while the top is held in an upward position by pressure in the housing and can only be released when the pressure in the housing is reduced and the top is moved downwardly. The locking means includes a notch in the exterior of the housing, a locking ring, and a backup shoulder on the exterior of the top. An anti-extrusion ring is bonded on the bottom edge of the top and slidably engages the interior of the housing for preventing damage to the separator. Preferably the top includes a dome and an annular flange extending around the lower end of the dome. The liquid inlet-outlet valve is a poppet valve in which the valve element is enclosed by a resilient coating with an annular resilient ring bonded to the coating and positioned to seat on the valve seat. The separator may be a bag separator or a cylindrical solid float having a tapered bottom with a plurality of axially extending recesses about its outer periphery for preventing the float from sticking on the interior of the housing.

7 Claims, 5 Drawing Figures

GAS-LIQUID ACCUMULATOR

BACKGROUND OF THE INVENTION

It is old to provide a gas-liquid accumulator such as a nitrogen-oil accumulator having a housing with a spring loaded liquid inlet-outlet valve connected to the bottom of the housing, a gas charging and releasing valve for charging and releasing gas from the housing, and a separator in the housing for separating the gas and liquid and for contacting and closing the liquid valve upon contact.

The present invention is directed to various improvements in such an accumulator such as a removable top for servicing the accumulator, a safety lock on the accumulator whereby the top cannot be released and cause possible injury when the accumulator is pressurized, an accumulator which will accept various types of separators, an improved solid float separator which will have a reduced tendency to stick to the interior wall of the accumulator, an anti-extrusion ring bonded to the top for preventing damage to the separator, and an improved liquid inlet-outlet valve which will more securely seal off against fluid flow when closed.

SUMMARY

One feature of the present invention is the provision of a top loading accumulator having a removable top which is slidably insertable into the top of the housing with releasable locking means positioned externally of the top for locking the top in the housing. Means are provided on the top for preventing the release of the locking means while the top is held in an upward position by pressure in the housing, and allows release of the locking means only when the pressure in the housing is reduced and the top is moved downwardly.

Another feature of the present invention is wherein the locking means includes a notch on the interior of the housing, a locking ring which may include a plurality of arcuate segments, and a backup shoulder on the exterior of the top for securing the locking ring in the notch when the accumulator is pressurized.

Still a further object of the present invention is wherein the top includes a circular dome and an annular flange extending around the lower end of the dome.

Yet a still further object of the present invention is the provision of an extrusion ring bonded to the bottom outer edge of the top which slidably engages the interior of the housing for aiding in sealing between the top and the housing and for preventing damage to the gas-liquid separator.

Yet a still further object of the present invention is wherein the accumulator includes a liquid inlet-outlet poppet valve in which the valve element is enclosed by a resilient coating for providing a more leakproof valve. Preferably an annular resilient ring is bonded to the coating and positioned to seat on the valve seat for further increasing the seal on the valve and avoiding the use of an expensively machined metal-to-metal seal.

Still a further object of the present invention is the provision of an improved gas-liquid separator which includes a cylindrical glass beaded float having a tapered body and including a plurality of axially extending recesses about its outer periphery for preventing the float from sticking on the interior of the housing and affording greater floatability due to increased surface areas.

Yet a still further object of the present invention is the provision of an accumulator in which various types of separators such as a float-type or a conventional bladder type may be utilized.

Other and further objects, features and advantages will be apparent from the following description of a presently preferred embodiment of the invention, given for the purpose of disclosure and taken in conjunction with the accompanying drawings.

DESCRIPTION OF THE PREFERRED EMBODIMENTS

Figure 1:
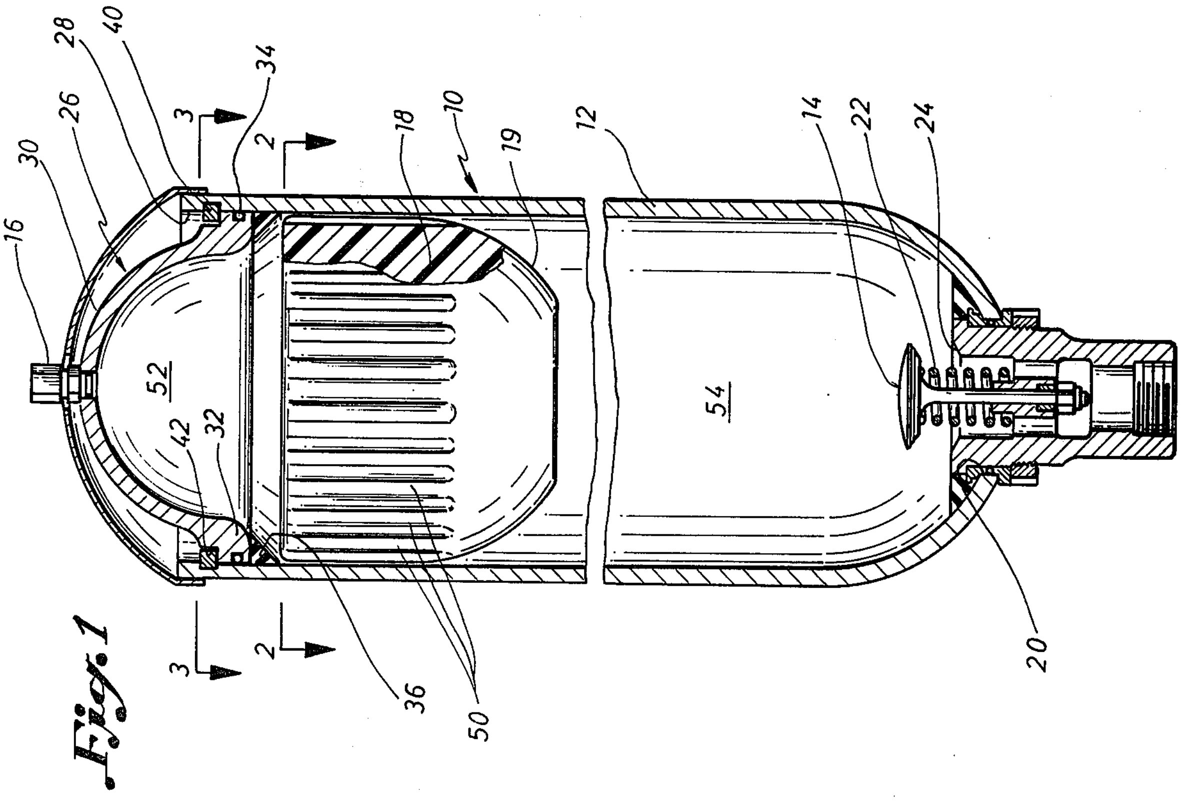
FIG. 1 is an elevational view, in cross section, of the apparatus of the present invention.

Referring now to the drawings, particularly to FIG. 1, the reference numeral 10 generally indicates the apparatus of the present invention and includes a housing or shell 12, a spring-loaded liquid inlet-outlet valve 14, a gas charging and release valve 16, and a separator 18.

The housing 12 is preferably generally a tubular steel member having an opening 20 in the bottom for the admission or exit of a liquid, such as oil, through the valve 14. The valve 14 is a modified poppet valve biased to the open position by a spring 22 and adapted to seat on valve seat 24 for closing the valve when pushed downwardly by engagement of the separator 18.

One feature of the present invention is the provision of providing an accumulator which is top loading, that is, one which has a removable top 26 whereby the accumulator top 26 may be easily removed and the interior may be inspected and repaired and even the separator 18 may be replaced without destroying the accumulator's code of approval. The housing 12 has a circular opening 28 and the top 26 is slidably insertable into and out of the opening 26. Preferably the top 28 includes a circular dome 30 and an annular flange 32 extending around the lower end of the dome 30 with suitable sealing means such as an O ring 34 for sealing against the interior of the housing 12. An antiextrusion ring 36 such as rubber is bonded to the bottom of the flange 32 and slidably engages the interior of the housing 12 for performing the function of a seal as well as preventing damage to the separator 18 in the event that the separator 18 is moved up rapidly by preloading the accumulator 10 with oil through the valve 14 before the accumulator 10 is precharged with gas, such as nitrogen, through the conventional gas valve 16.

Figure 3:
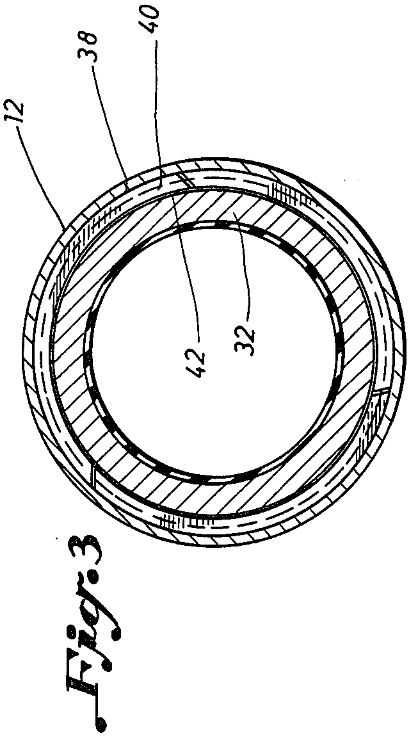
FIG. 3 is a cross-sectional view taken the lines 3—3 of FIG. 1.

Another feature of the present invention is the provision of providing releasable locking means between the top 26 and the housing 12 which cannot be released while the accumulator 10 is under pressure. That is, it is important that the pressure in the accumulator 10 be emptied prior to unlocking the top 26 in order to prevent possible injury to the workmen. The releasable locking means (FIGS. 1 and 3) may include a circular notch 38 in the interior of the opening 28 of the housing 12, a locking ring 40, such as a plurality of arcuate segments, such as three in number, and an annular backup shoulder 42 on the exterior of the top 26 which prevents release of the locking ring 40 when the accumulator 10 is pressurized. Thus, with the accumular 10 depressurized, the top 26 may be slidably inserted into the opening 28 below the notch 38 and the locking ring segments 40 inserted. The top 26 may then be raised bringing the backup shoulder 42 into engagement with the interior surface of the locking ring segments 40 whereby they are maintained in the notch 38 and the accumulator precharged through the gas valve 16. The backup shoulder 42 will keep the locking ring segments 40 in their locked position and prevent any inadvertent release of the segments while the accumulator is pressurized. When it is desired to remove the top 26, the accumulator must be depressurized in order that the top 26 may be moved downwardly to move the backup shoulder 42 out of engagement with the locking ring 40 before the locking ring 40 may be removed.

Figure 4:
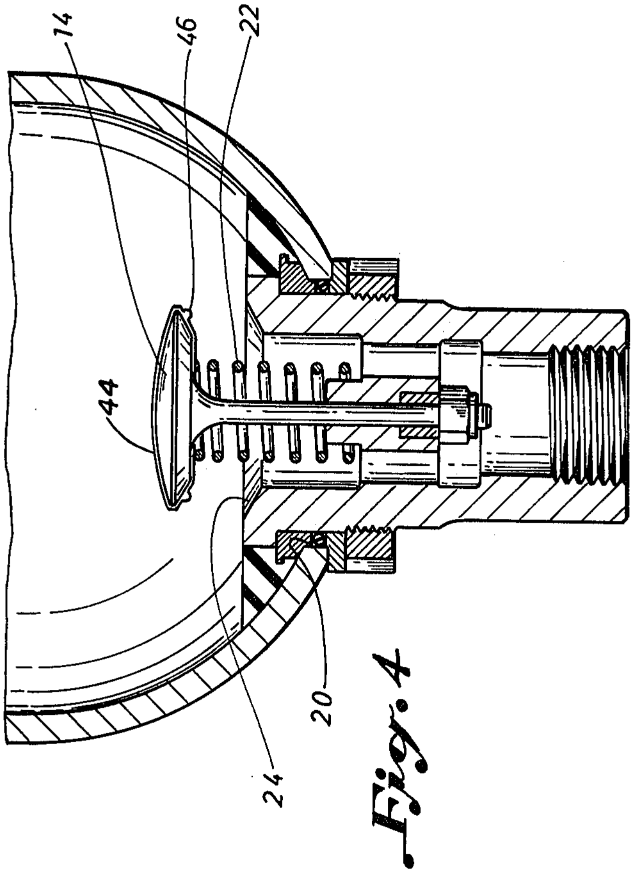
FIG. 4 is an enlarged fragmentary elevational view of the liquid valve of the present invention.

Referring now to the valve 14 (FIG. 4), it is conventional to provide a metal poppet valve which seats on the valve seat 24 with a metal-to-metal seal. However, in order to obtain a suitable seal and prevent the loss of any gas precharged from the accumulator 10, the tolerances on the valve 14 and valve seat 24 are required to be extremely fine and therefore quite expensive. The present invention is directed to providing a resilient coating 44, such as rubber bonded to the valve element 14 which provides a satisfactory seal when the valve 14 seats on the valve seat 24 without requiring extremely close tolerances in order to seal gas. Additionally, if desired, an annular resilient ring 46 may be provided bonded to the coating 44 and positioned to seat on the valve seat to provide a still better seal.

Figure 2:
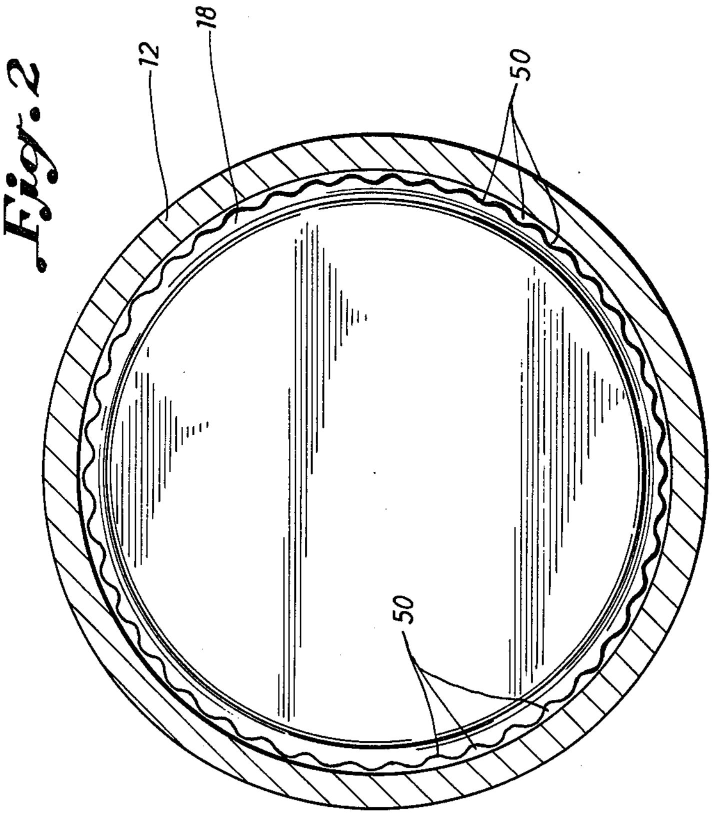
FIG. 2 is a cross-sectional view taken along the lines 2—2 of FIG. 1.

Another feature of the present invention is a provision of a float type separator 18 (FIGS. 1 and 2) which includes a solid cylindrical float having a tapered bottom. While the float may be made of any suitable material, a glass beaded material, such as syntactic foam buoyancy material sold under such trademark as "ECCOFLOAT" or "WARCOFLOAT" is satisfactory. The glass bead material retains its bouyancy in spite of any damage, is solid and does not have any cavities which would be subject to filling up with liquid and changing its bouyant characteristics, is not subject to crushing as are hollow floats, and will not deform under high pressures. Also, the separator 18 includes fluting or a plurality of axially extending recesses 50 about its outer periphery for preventing the float 18 from sticking on the interior wall of the housing 12. That is, the liquid in the recesses 50 acts to break up any capillary attraction between the float 18 and the inside wall of the housing 12. The separator 18 suitably acts to maintain a separation of the gas 52 from the liquid 54 and also satisfactorily contacts and moves the valve element 14 to a closed position when the oil 54 is substantially all expelled from the housing 12. The tapered bottom 19 of the float 18 insures that a sufficient amount of oil 54 remains in the housing 12 when the float 18 actuates the valve 14 in order to prevent any possible loss of gas 52 through the valve 14.

Figure 5:
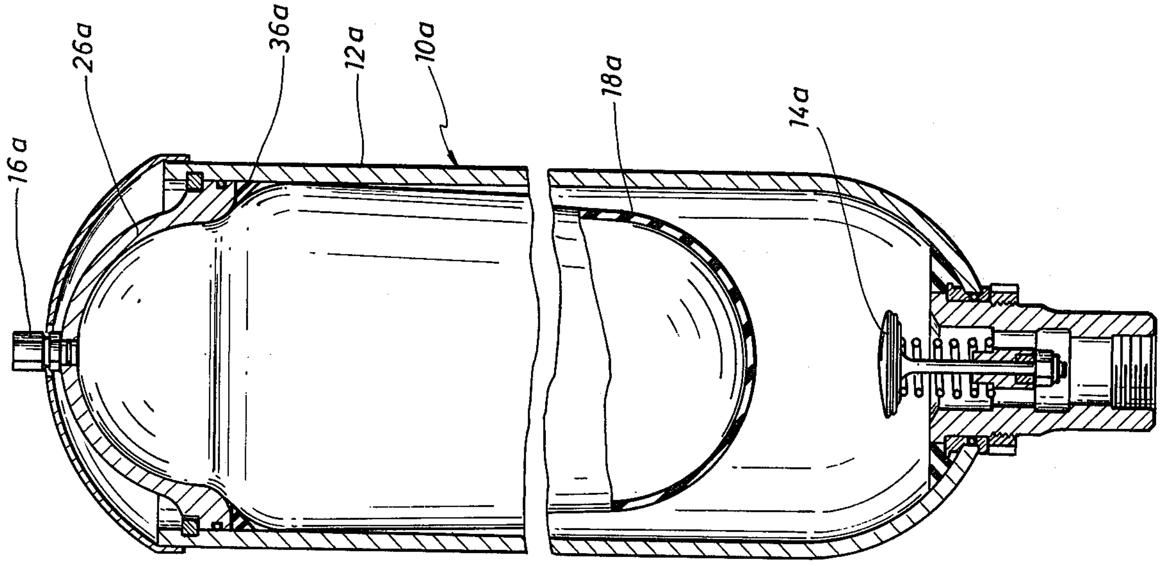
FIG. 5 is an elevational view, in cross section, of the apparatus of the present invention with a different type separator.

Referring now to FIG. 5, a modified form of the present invention is shown in which a conventional bladder type separator 18*a* is interchanged for the float separator 18 of FIG. 1. The accumulator 10*a* will conveniently accommodate the bladder 18*a* and the internal contours of the top 26*a*, ring 36*a* and housing 12*a* will suitably protect the bladder 18*a* and prevent it from becoming pinched or damaged during operation. The construction of the accumulator 10*a* is identical to the construction of the accumulator 10 with the exception that the gas valve 16*a* also extends through the bladder 18*a* in a sealing relationship as well as through the top 26*a*. Thus the user has the option in utilizing the present accumulator with the type of separator he prefers.

The present invention, therefore, is well adapted to carry out the objects and obtain the ends and advantages mentioned as well as others inherent therein. While presently preferred embodiments of the invention have been given for the purpose of disclosure, numerous changes in the details of construction and arrangement of parts will be readily apparent to those skilled in the art and which are encompassed within the spirit of the invention and the scope of the appended claims.

What is claimed is:

1. A gas-liquid accumulator comprising,
a housing,
a spring loaded liquid inlet-outlet valve connected to the bottom of the housing,
a gas charging and release valve for charging and releasing gas from the housing,
a separator in the housing for separating the gas and liquid,
a removable top releasably connected to the housing, said top being slidably insertable into the top of the housing,
releasable locking means positioned externally of the top for locking said top in the housing and,
means on the top for preventing release of the locking means while the top is held in an upward position by pressure in the housing, but allowing release of the locking means when the pressure in the housing is reduced and the top moves downwardly and wherein,
the liquid inlet-outlet valve is a poppet valve in which the valve element is enclosed by a resilient coating, and
an annular resilient ring bonded to the coating and positioned to seat on the valve seat.

2. A gas-liquid accumulator comprising,
a housing,
a spring loaded liquid inlet-outlet valve connected to the bottom of the housing,
a gas charging and release valve for charging and releasing gas from the housing,
a separator in the housing for separating the gas and liquid,
a removable top releasably connected to the housing, said top being slidably insertable into the top of the housing,
releasable locking means positioned externally of the top for locking top in the housing and,
means on the top for preventing release of the locking means while the top is held in an upward position by pressure in the housing, but allowing release of the locking means when the pressure in the housing is reduced and the top moves downwardly, and wherein
said separator includes a cylindrical float having a tapered bottom, and
said float includes a plurality of axially extending recesses around its outer periphery for preventing the float from sticking on the interior of the housing.

3. A gas-liquid accumulator comprising, a tubular housing with a tubular open top and a closed bottom, a spring loaded liquid inlet-outlet valve in the bottom for the admission and exit of liquid, a separator in the housing for separating the gas and liquid, a removable top releasably connected to the housing, said top including a circular dome and an annular flange extending around the lower end of the dome and slidably insertable into the top of the housing, releasable locking means for locking the top in the housing, said locking means including a circular notch in the interior of the housing, a locking ring, and a backup shoulder on the exterior of the top for securing the locking ring in the notch when the accumulator is pressurized but allowing release of the locking ring when the pressure in the housing is reduced and the top is moved downwardly, and a gas charging and release valve connected to the top, and wherein the liquid inlet-outlet valve is a poppet valve in which the valve element is enclosed by a resilient coating, and an annular resilient ring bonded to the coating and positioned to seat on the valve seat.

4. A gas-liquid accumulator comprising, a tubular housing with a tubular open top and a closed bottom, a spring loaded liquid inlet-outlet valve in the bottom for the admission and exit of liquid, a separator in the housing for separating the gas and liquid, a removable top releasably connected to the housing, said top including a circular dome and an annular flange extending around the lower end of the dome and slidably insertable into the top of the housing, releasable locking means for locking the top in the housing, said locking means including a circular notch in the interior of the housing, a locking ring, and a packup shoulder on the exterior of the top for securing the locking ring in the notch when the accumulator is pressurized but allowing release of the locking ring when the pressure in the housing is reduced and the top is moved downwardly, and a gas charging and release valve connected to the top, and wherein said separator includes a solid cylindrical float having a tapered bottom, and said float includes a plurality of axially extending recesses about its outer periphery for preventing the float from sticking on the interior of the housing.

5. In a gas-liquid accumulator having a housing, a spring loaded liquid inlet-outlet valve connected to the bottom of the housing, and a gas charging and release valve for charging and releasing gas from the housing, the improvement in a separator in the housing for separating the gas and liquid and actuating the liquid valve comprising, a solid cylindrical buoyant float having a tapered bottom, and a plurality of axially extending recesses around its outer periphery for preventing the float from sticking on the interior of the housing.

6. The apparatus of claim 5 wherein the float is a syntactic foam.

7. In a gas-liquid accumulator having a housing, a spring loaded liquid inlet-outlet valve connected to the bottom of the housing, a gas charging and release valve for charging and releasing gas from the housing, a separator in the housing for separating the gas and liquid and actuating the liquid valve, the improvement in the liquid inlet-outlet valve comprising, said valve being a poppet valve in which the valve element is enclosed by a resilient coating, and an annular resilient ring bonded to the coating and positioned to seat on the valve seat.

* * * * *

UNITED STATES PATENT OFFICE
CERTIFICATE OF CORRECTION

Patent No. 4,413,652 Dated November 8, 1983

Inventor(s) Murry Allewitz

It is certified that error appears in the above-identified patent and that said Letters Patent are hereby corrected as shown below:

Column 4, line 36, after "downwardly" add -- , --

Column 4, line 37, after "wherein" delete -- , --

Column 4, line 55, after "locking" insert --said--

Column 4, line 55, after "housing" insert -- , --

Column 4, line 55, after "and" delete -- , --

Signed and Sealed this

*Twenty-fourth* Day of *April 1984*

[SEAL]

*Attest:*

GERALD J. MOSSINGHOFF

*Attesting Officer* *Commissioner of Patents and Trademarks*